United States Patent [19]

Krinickas, Jr. et al.

[11] Patent Number: 4,751,417
[45] Date of Patent: Jun. 14, 1988

[54] METHOD OF INCREASING OPERATING EFFICIENCY OF ELECTRIC MACHINES

[75] Inventors: Alexander Krinickas, Jr.; Madan L. Bansal, Rockford, both of Ill.

[73] Assignee: Sundstrand Corporation, Rockford, Ill.

[21] Appl. No.: 106,996

[22] Filed: Oct. 5, 1987

Related U.S. Application Data

[63] Continuation of Ser. No. 915,375, Oct. 6, 1986, abandoned.

[51] Int. Cl.⁴ .................. H02K 17/16; B23K 26/00
[52] U.S. Cl. ............................ 310/211; 29/598; 219/121 LH; 310/42; 310/261
[58] Field of Search ............... 219/121 LH, 121 LJ; 310/211, 42, 261, 105; 430/945; 29/620

[56] References Cited

U.S. PATENT DOCUMENTS

| | | | |
|---|---|---|---|
| 3,530,573 | 9/1970 | Helgeland | 219/121 LJ |
| 4,170,726 | 10/1979 | Okuda | 219/121 LN |
| 4,229,640 | 10/1980 | Castellani-Longo | 219/121 LJ |
| 4,317,023 | 2/1982 | Gryskiewicz | 219/121 LN |
| 4,329,564 | 5/1982 | Hazelton et al. | 219/121 LG |
| 4,339,655 | 7/1982 | Lauroesch | 219/121 LH |
| 4,356,376 | 10/1982 | Komanduri et al. | 219/121 LN |
| 4,566,936 | 1/1986 | Bowlin | 156/627 |
| 4,628,179 | 12/1986 | Crahay | 219/121 LJ |
| 4,644,210 | 2/1987 | Meisner et al. | 310/211 |

FOREIGN PATENT DOCUMENTS 179588 10/1983 Japan ............. 219/121 LJ

Primary Examiner—Patrick R. Salce
Assistant Examiner—D. L. Rebsch
Attorney, Agent, or Firm—Wood, Dalton, Phillips, Mason & Rowe

[57] ABSTRACT

In order to improve the efficiency of electric machines, by reducing losses caused by eddy currents induced by high frequency fluxes, the outer surface of the rotor, including the rotor pole face, has a plurality of circumferential grooves. The grooves are provided in axially spaced relation along the rotor. Preferably, the method of reducing losses includes the step of forming the grooves by laser cutting, which permits the width and spacing of the grooves to be minimized so as to maximize loss reduction by increasing resistance to eddy currents.

22 Claims, 1 Drawing Sheet

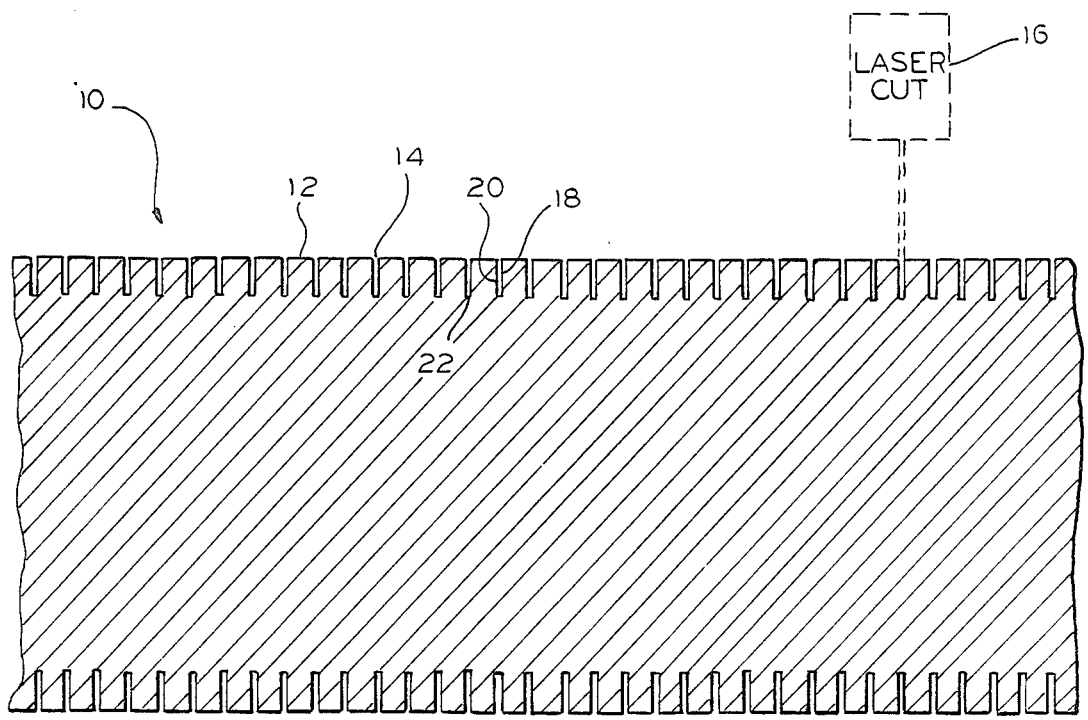

METHOD OF INCREASING OPERATING EFFICIENCY OF ELECTRIC MACHINES

This application is a continuation, of application Ser. No. 915,375, filed Oct. 6, 1986 now abandoned.

FIELD OF THE INVENTION

The present invention relates to electric machines and, more particularly, to increasing the operating efficiency of electric machines.

BACKGROUND OF THE INVENTION

Electric machines such as motors and generators are known to suffer from eddy current losses generally due to the fact that eddy currents are generated in the pole face of rotors. This occurs by reason of high frequency fluxes in the air gap between rotors and stators. While the losses depend on the frequencies generated and materials utilized for rotor fabrication, they can be very high, particularly in high speed electric machines, which reduces operating efficiency considerably.

Generally, it is recognized that eddy current loss = $V^2/R$, where V is voltage induced in the surface of the rotor and R is the resistance to eddy current. In order to reduce losses caused by eddy currents induced by fluxes in the air gap between rotors and stators, laminated rotors consisting of alternating layers of conductive material and insulation are conventionally utilized since the insulation layers break up eddy currents and, therefore, tend to reduce eddy current loss. Unfortunately, it is impractical to use laminated rotors with high speed and large rotor diameter electric machines, i.e., electric machines operating in excess of 40,000 RPM with 3.5 inch rotor diameter.

The present invention is directed to overcoming the above stated problems and accomplishing the stated objective by providing an electric machine and method of improving efficiency of electric machines.

SUMMARY OF THE INVENTION

Accordingly, the present invention is directed to a method of reducing losses caused by eddy currents induced by high frequency fluxes. The method includes the steps of providing a rotor having an outer surface formed exclusively of a conductive material and machining the outer surface to provide a plurality of circumferential grooves in axially spaced relation. Preferably, the machining step includes forming the grooves by laser cutting which permits the width and spacing of the grooves to be minimized to maximize loss reduction by increasing resistance to eddy currents.

More specifically, the rotor is preferably a solid rotor and the grooves are equally spaced and disposed along the entire length of the rotor. Then, depending upon the particular operating characteristics of a given electric machine, the width, depth and spacing of the grooves can be selected to maximize loss reduction by increasing resistance to eddy currents. Moreover, the grooves are each defined by a pair of parallel side walls terminating in a circumferential bottom surface radially inward of the outer surface of the rotor.

In an exemplary embodiment, the electric machine is of a type in which high frequency fluxes are generated which induce eddy currents in a rotor pole face. The invention includes the improvement in such an electric machine including a rotor having an outer surface formed of a conductive material wherein the outer surface of the rotor is provided with a plurality of circumferential grooves in axially spaced relation. With this construction, the operating efficiency of the electric machine is significantly increased by reducing losses caused by induced eddy currents.

Other objects, advantages and features of the present invention will become apparent from the following specification taken in conjunction with the accompanying drawing.

BRIEF DESCRIPTION OF THE DRAWING

The drawing is a partially schematic cross-sectional view illustrating a rotor being machined for an electric machine utilizing a method all in accordance with the present invention.

DETAILED DESCRIPTION OF THE PREFERRED EMBODIMENT

An exemplary embodiment of a grooved rotor for an electric machine in accordance with the invention is illustrated in the drawing. The rotor 10 is particularly well suited for use with an electric machine such as a motor or generator in which high frequency fluxes are generated which induce eddy currents in a rotor pole face. As shown, the rotor 10 has an outer surface 12 formed exclusively of a conductive material such as magnetic steel or a magnetic alloy.

With regard to the rotor 10, it will be seen that the outer surface 12 has a plurality of circumferential grooves 14 in axially spaced relation. The grooves 14, as will be described in greater detail hereinafter, increase the operating efficiency of the electric machine by reducing losses caused by induced eddy currents. Preferably, the grooves 14 are formed by machining the outer surface 12 of the rotor 10 by means of laser cutting with a laser generating device 16.

The present invention is also directed to a method of reducing losses caused by eddy currents induced by high frequency fluxes. The method includes the steps of providing a rotor 10 having an outer surface 12 formed exclusively of a conductive material and, thereafter, machining the outer surface 12 to provide a plurality of circumferential grooves 14 in axially spaced relation. Moreover, the method preferably includes the step of selecting the width, depth and spacing of the grooves 14 to maximize loss reduction by increasing resistance to eddy currents.

As shown, the rotor 10 is preferably a solid rotor and the grooves 14 are preferably equally spaced and disposed along the entire length of the rotor 10. The grooves 14 are each defined by a pair of parallel side walls 18 and 20 terminating in a circumferential bottom surface 22 radially inwardly of the outer surface 12 of the rotor 10. With this construction, the side walls 18 and 20 are preferably transverse to the axis of the rotor 10 and the bottom surfaces 22 are preferably generally concentric with the outer surface 12 of the rotor 10.

By utilizing laser cutting with the laser generating device 16, the width and spacing of the grooves 14 can be minimized to maximize loss reduction by increasing resistance to eddy currents. It is also then possible to select the depth of the grooves to maximize loss reduction in the same fashion. While it might be possible to utilize conventional machining techniques for forming the grooves 14, it is advantageous to employ laser cutting due to the enhanced operating efficiencies that can be achieved.

As will be appreciated, laser cutting by means of the laser generating device 16 permits creation of very thin grooves 14. For instance, the grooves 14 can be formed on the order of 0.006 inches wide by ⅛ inch deep and can be spaced apart by a distance on the order of 0.030–0.040 inches. In order to minimize losses caused by eddy currents induced by high frequency fluxes, the width and spacing of the grooves 14 is minimized to the extent possible.

In this connection, minimizing the width and spacing of the grooves 14 increases the length of eddy current path. This, in turn, increases the resistance and, hence, losses are reduced considerably by reason of the fact that eddy current loss=$V^2/R$, where V is voltage induced in the outer surface 12 of the rotor 10 and R is the resistance to eddy current. The width, depth and spacing of the grooves 14 can be controlled and optimized for given performance parameters.

By providing the thinnest air gap possible between the respective pairs of side walls 18 and 20, the high frequency fluxes which extend perpendicular to the axis of the rotor 10 are broken. This increases the resistance to eddy current at the gaps and, therefore, decreases losses. While useful in any high speed electric machine, it is particularly advantageous for use in organic Rankine cycle engines of the type that may be utilized in the Space Station.

While in the foregoing there has been set forth a preferred embodiment of the invention, it is to be understood that the invention is only to be limited by the spirit and scope of the appended claims.

We claim:

1. A method of reducing losses in electric machines caused by eddy currents in rotors induced by high frequency fluxes, comprising the steps of:
    providing a solid rotor having an outer surface, said solid rotor being formed exclusively of a single conductive material; and
    machining said outer surface by laser cutting said solid rotor to provide a plurality of circumferential grooves in said single conductive material in axially spaced relation;
    said grooves each extending radially inwardly of said outer surface of said solid rotor, said grooves each being machined so as to be on the order of 0.006 inches wide.

2. The method of reducing losses as defined by claim 1 wherein said grooves are each defined by a pair of parallel side walls terminating in a circumferential bottom surface.

3. The method of reducing losses as defined by claim 1 wherein said grooves are equally spaced.

4. The method of reducing losses as defined by claim 1 wherein said grooves are disposed along substantially the entire length of said rotor.

5. The method of reducing losses as defined by claim 1 including the step of selecting the width, depth and spacing of said grooves to maximize loss reduction by increasing resistance to eddy currents.

6. The method of reducing losses as defined by claim 2 wherein said side walls are transverse to the axis of said rotor and said bottom surfaces are generally concentric with said outer surface of said rotor.

7. The method of reducing losses as defined by claim 1 including the step of minimizing the width and spacing of said grooves to maximize loss reduction by increasing resistance to eddy currents.

8. The method of reducing losses as defined by claim 7 including the step of selecting the depth of said grooves to maximize loss reduction by increasing resistance to eddy currents.

9. A method of increasing operating efficiency of high speed electric machines by reducing losses caused by eddy currents, comprising the steps of:
    providing a solid rotor having an outer surface, said solid rotor being formed of a single conductive material; and
    laser cutting said outer surface of said solid rotor to provide a plurality of circumferential grooves in said single conductive material in axially spaced relation, said grooves being equally spaced along substantially the entire length of said solid rotor and each being on the order of 0.006 inches wide, said grooves each being defined by a pair of parallel side walls extending radially inwardly of said outer surface to a circumferential bottom surface.

10. The method of increasing operating efficiency as defined by claim 9 including the step of selecting the width, depth and spacing of said grooves to maximize loss reduction by increasing resistance to eddy currents.

11. The method of increasing operating efficiency as defined by claim 9 wherein said side walls are transverse to the axis of said rotor and said bottom surfaces are generally concentric with said outer surface of said rotor.

12. The method of increasing operating efficiency as defined by claim 9 including the step of minimizing the width and spacing of said grooves to maximize loss reduction by increasing resistance to eddy currents.

13. The method of increasing operating efficiency as defined by claim 9 including the step of selecting the depth of said grooves to maximize loss reduction by increasing resistance to eddy currents.

14. In an electric machine in which high frequency fluxes are generated which induce eddy currents in a rotor pole face, the improvement comprising:
    a solid rotor having an outer surface, said solid rotor being formed exclusively of a single conductive material, said outer surface of said solid rotor having a plurality of circumferential grooves in said single conductive material in axially spaced relation, said grooves each being formed by laser cutting to extend radially inwardly of said outer surface of said solid rotor, said grooves each being cut so as to be on the order of 0.006 inches wide;
    whereby operating efficiency is increased by reducing losses caused by induced eddy currents.

15. The electric machine as defined by claim 14 wherein said grooves are equally spaced.

16. The electric machine as defined by claim 14 wherein said grooves are disposed along substantially the entire length of said rotor.

17. The electric machine as defined by claim 14 wherein said grooves are each defined by a pair of parallel side walls terminating in a circumferential bottom surface.

18. The electric machine as defined by claim 17 wherein said side walls are transverse to the axis of said rotor and said bottom surfaces are generally concentric with said outer surface of said rotor.

19. The electric machine as defined by claim 14 wherein the width and spacing of said grooves are minimized and the depth of said grooves is selected to maximize loss reduction by increasing resistance to eddy currents.

20. The method of reducing losses as defined by claim 1 wherein said grooves each are on the order of 0.125 inches deep and are spaced from the next adjacent of said grooves by on the order to 0.30 to 0.40 inches.

21. The method of increasing operating efficiency as defined by claim 9 wherein said grooves each are on the order of 0.125 inches deep and are spaced from the next adjacent of said grooves by on the order to 0.30 to 0.40 inches.

22. The electric machine as define by claim 14 wherein said grooves each are on the order of 0.125 inches deep and are spaced from the next adjacent of said grooves by on the order to 0.30 to 0.40 inches.

* * * * *